Nov. 5, 1963 M. SCHMIDT 3,109,196
EXTRUDER HAVING AN INTERCHANGEABLE INJECTOR HEAD
Filed Dec. 19, 1960

INVENTOR:
MAX SCHMIDT

McGlew and Toren
ATTORNEYS

United States Patent Office 3,109,196
Patented Nov. 5, 1963

3,109,196
EXTRUDER HAVING AN INTERCHANGEABLE INJECTOR HEAD
Max Schmidt, Brauhausstrasse 17, Ansbach, Germany
Filed Dec. 19, 1960, Ser. No. 76,564
Claims priority, application Germany Dec. 17, 1959
3 Claims. (Cl. 18—12)

This invention relates in general to extrusion devices and in particular to a new and useful screw extruder injection machine including interchangeable injection assembly portions having means for permitting a change in the size of the screw feeding shaft and for employing a completely new injection assembly which may be easily assembled to the orifice portion of a screw extruder machine.

Extrusion of synthetic materials has in recent times achieved widespread use. The extrusion injection molding of parts of relatively large cross-section or diameter requires a conveyor screw in the extruder having a correspondingly large diameter. For example, a skirting or a ledge having a diameter of about 60 mm. requires an extrusion machine with a screw conveyor diameter of about 50 mm. On the other hand, a small diameter article, such as a drinking straw with an internal diameter of about 2 mm., or a curtain runner with a diameter of about 7 mm., or a ball point pen tube with a diameter of about 3 mm. all require a screw diameter for the extruding machine of inner rings of 20 to 30 mm. In order for a facility to be able to extrude parts of all sizes it is necessary, therefore, to have the separate machines for the various screw diameters. Such separate machines are expensive and it is difficult for a small firm to include many sizes of machines which are necessary both from financial standpoints and from space standpoints. Thus the small size firm must either specialize in small parts or in relatively large diameter parts, but not both.

In accordance with the present invention an extrusion machine is provided with an interchangeable injecton assembly or injection head. The extruder itself includes a housing for a large diameter screw conveyor shaft and means for assembling an injection assembly to a nozzle portion of the extruder in alignment with the large diameter shaft for driving connection thereto. The apparatus includes means for removing the injection assembly and the screw conveyor shaft and replacing these parts with parts for effecting extrusion of smaller sized elements. A smooth shaft is positioned in the same housing as the removed screw conveyor shaft of large diameter and connected to a small diameter screw conveyor located in a portion of the injection head assembly to convert the extrusion device to a smaller sized part formation operation. Thus it is possible with the invention to convert an extrusion machine having a screw conveyor 50 to 70 mm. in diameter to a screw machine with a 20 to 30 mm. diameter by simply removing an injection assembly and connecting shaft from the machine and replacing it with one having the parts for operating the smaller diameter screw conveyor.

The invention includes an arrangement in which the mounting or journaling of the large diameter original screw conveyor and that of a smooth surface driving shaft is the same so that it is very simple to exchange the conveyor screw for the smooth surface shaft. Instead of the original injector assembly or head for the large diameter screw, the nozzle or orifice of the large extruder is provided with a substitute attachment having a small conveyor screw arranged therein and driven by means of the smooth surface shaft. The parts of the apparatus are arranged for interchangeability in this manner by a simple unloosening of a bolted connection.

Thus the invention includes an extruder machine having a removable injector head assembly containing the drive, control arrangements, switching circuit, etc., which assembly is removable from the extruder and replaceable by a smaller sized assembly.

The additional price factor cost involved in converting the machine into a machine which can be used for both large and small sizes is very negligible, particularly if calculated with respect to the utilization to which the machine can now be put. It should be appreciated, of course, that the machine can be used not only with one attachment giving a two range diameter use for the machine, but with many attachments with various sizes as desired. Moreover, it is of course possible to convert a small sized screw machine into a screw machine capable of handling large diameters in a manner similar to that obtained by converting the large sizes diameter screw machine.

Accordingly it is an object of this invention to provide an improved extruder.

A further object of the invention is to provide an extruder having a housing for rotatably supporting a screw conveyor of a predetermined diameter and means for supporting an injection assembly in alignment therewith, the injection assembly being removable and replaceable with one having a different diameter screw conveyor, the screw conveyor of said extruder portion being removable and replaceable with a shaft for driving a screw conveyor in said injection assembly.

A further object of the invention is to provide an improved extruder including interchangeable means for facilitating the extrusion of a wide range of sizes of articles.

A further object of the invention is to provide an extruder which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
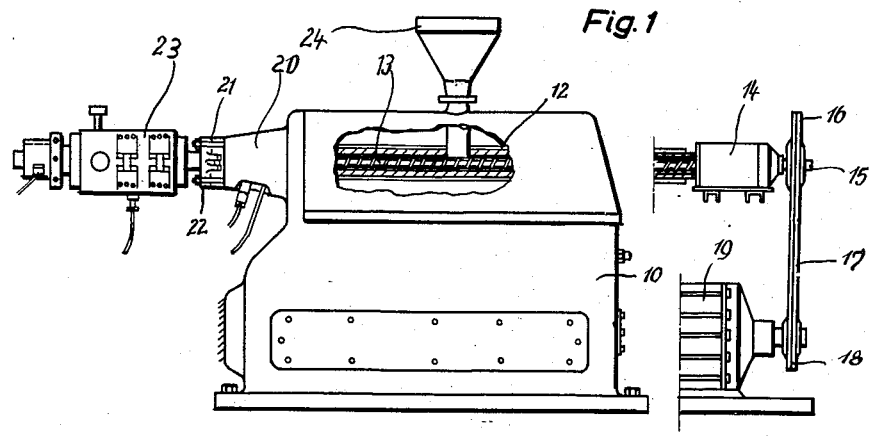
FIG. 1 is a side elevation having portions broken away of an extruder constructed in accordance with the invention.

Referring to the drawings in particular the invention embodied therein includes an extrusion device comprising a main housing 10 having a hollow tubular portion 12 in which a large diameter screw conveyor 13 is rotatable. The extreme end of the screw conveyor 13 is supported in a bearing 14 and a shaft extension 15 of the conveyor is provided with a pulley 16 which is driven by a belt 17 from a pulley 18 of a driving motor 19.

The opposite end of the housing 10 is provided with a nozzle portion 20 having a flange 21 arranged to receive a flanged end 22 of an injection assembly 23. The injection assembly 23 includes usual driving mechanisms, control arrangements and switching circuits necessary for the proper operation of the injection portion of the apparatus. In the embodiment indicated in FIG. 1, internal means (not shown) are connected to the screw conveyor 13 and arranged to receive material delivered thereby which is inserted into a hopper or funnel 24 which connects through the housing 10 to the hollow tubular member 12.

In accordance with the invention when it is desired to switch from a different sized diameter conveyor than that of the screw conveyor 13 the injector assembly 23 is removed and a replacement injector assembly 25 having a flange portion 26 is bolted to the nozzle portion 20 of the housing. Before this is done, however, the screw conveyor 13 is replaced by a shaft 27 which is similarly supported in the bearing 14 and in the nozzle portion 20 within the hollow tubular member 12 in the same manner as the conveyor 13 was supported. In the arrangement indicated in FIG. 3, however, the changed injector assembly 25 includes a smaller sized screw conveyor on the interior thereof (not shown) which is driven by the smooth shaft 27 by suitable connections made before the flange portion 26 is bolted to the flange portion 21.

Figure 2:
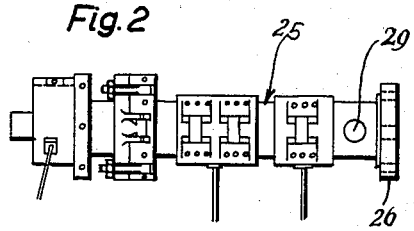
FIG. 2 is a side elevation of a replacement injection assembly.
Figure 3:
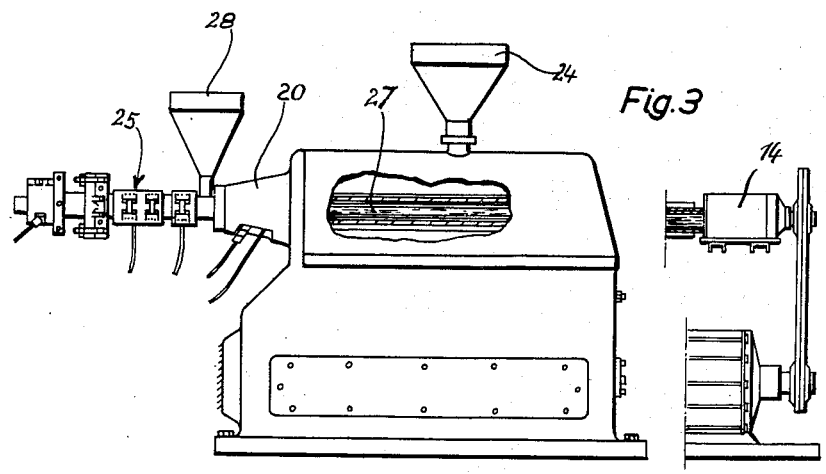
FIG. 3 is a view similar to FIG. 1 with the replacement injection assembly indicated in an operative position connected to the housing nozzle portion.

In the revised arrangement indicated in FIG. 3 the funnel 24 is no longer employed but instead a funnel 28 is used which must be inserted in an opening 29 provided on the injector assembly 25 as indicated in FIG. 2. In some instances, however, it is possible to permit the continued feeding through the hopper 24 by incorporating a conveyor portion on the shaft 27 to facilitate this feeding.

Thus the invention provides means for changing from an extruder machine which is capable of producing parts of a given diameter to one capable of producing parts through a large range of diameters depending, of course, upon the number of replacement portions 25 which are provided.

While a specific embodiment of the invention has been shown and described in detail to illustrate the application of the invention principles, it will be understood that the invention may be embodied otherwise without departing from such principles.

What is claimed is:

1. In an extruder for injection molding having a cylindrical member, a removable first screw conveyor rotatable in said cylindrical member, and means at one end of said cylindrical member for rotating said screw conveyor, the improvement comprising an interchangeable injection head attachment mountable on said extruder on the opposite end from said rotating means and having a second conveyor screw of a size selected for a given operation in accordance with the size of an article to be extruded and disposed in axial alignment with said first screw conveyor, said second screw conveyor being aligned with said cylindrical member and having means thereon for connecting said second screw conveyor to said rotating means, said first screw conveyor being replaceable by a drive shaft adapted to be connected to said rotating means and to said second screw conveyor.

2. In an extruder according to claim 1, including an exchangeable filling funnel connected to said cylindrical member.

3. In an extruder according to claim 1, wherein said attachment includes an exchangeable filling funnel.

References Cited in the file of this patent

UNITED STATES PATENTS

| | | |
|---|---|---|
| 1,952,038 | Fischer | Mar. 20, 1934 |
| 2,332,829 | Parsons et al. | Oct. 26, 1943 |
| 2,438,856 | Knowles | Mar. 30, 1948 |
| 2,556,391 | Hawk | June 12, 1951 |
| 2,629,132 | Willcox | Feb. 24, 1953 |
| 2,705,342 | Hendry | Apr. 5, 1955 |
| 2,734,226 | Willert | Feb. 14, 1956 |
| 2,770,836 | Hankey | Nov. 20, 1956 |
| 2,944,288 | Sherman | July 12, 1960 |
| 3,025,565 | Doriat et al. | Mar. 20, 1962 |